US 8,261,177 B2

(12) United States Patent
Krishnaswamy et al.

(10) Patent No.: US 8,261,177 B2
(45) Date of Patent: Sep. 4, 2012

(54) GENERATING MEDIA PRESENTATIONS

(75) Inventors: Vinay Krishnaswamy, Woodinville, WA (US); James E. Oker, Woodinville, WA (US); Ravipal S. Soin, Sammamish, WA (US); Ramraj Rajkumar, Redmond, WA (US); Stephane Comeau, Seattle, WA (US); Patrick Schreiber, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1501 days.

(21) Appl. No.: 11/424,744

(22) Filed: Jun. 16, 2006

(65) Prior Publication Data

US 2007/0294619 A1 Dec. 20, 2007

(51) Int. Cl.
*G06F 17/00* (2006.01)
(52) U.S. Cl. ......... 715/202; 715/203; 715/204; 715/704
(58) Field of Classification Search .......... 715/202–204, 715/240, 249, 704
See application file for complete search history.

(56) References Cited

U.S. PATENT DOCUMENTS

| | | | |
|---|---|---|---|
| 5,404,316 A | 4/1995 | Klingler et al. | |
| 5,852,435 A | 12/1998 | Vigneaux et al. | |
| 5,872,573 A * | 2/1999 | Adegeest | 345/621 |
| 5,999,173 A | 12/1999 | Ubillos | |
| 6,081,262 A * | 6/2000 | Gill et al. | 715/202 |
| 6,164,975 A | 12/2000 | Weingarden et al. | |
| 6,369,835 B1 * | 4/2002 | Lin | 715/726 |
| 6,400,378 B1 | 6/2002 | Snook | |
| 6,493,690 B2 | 12/2002 | Bertrand et al. | |
| 6,581,051 B1 * | 6/2003 | Ueno et al. | 706/47 |
| 6,633,742 B1 | 10/2003 | Turner et al. | |
| 6,928,613 B1 | 8/2005 | Ishii et al. | |
| 6,938,032 B1 * | 8/2005 | Heath et al. | 1/1 |
| 6,978,115 B2 | 12/2005 | Whitehurst et al. | |
| 7,103,840 B2 | 9/2006 | Ihara et al. | |
| 7,234,113 B1 * | 6/2007 | Matz et al. | 715/738 |
| 7,418,656 B1 | 8/2008 | Petersen | |

(Continued)

FOREIGN PATENT DOCUMENTS

WO   WO 01/39063 A1   5/2001

OTHER PUBLICATIONS

Office Action dated Feb. 19, 2010, U.S. Appl. No. 11/428,074, filed Jun. 30, 2006.

(Continued)

*Primary Examiner* — Tadeese Hailu
(74) *Attorney, Agent, or Firm* — Vierra Magen Marcus & DeNiro LLP

(57) ABSTRACT

A presentation application provides for authoring and playback of a presentation. A presentation is an interactive collection of activities. An activity may include one or more frames, wherein each frame includes one or more modules. A module may consist of media content such as video, text, images or other content. A user may provide input during playback of the presentation. In response to the input, the module or frame receiving the input may call an action on a presentation activity, frame or module, thereby allowing the user to navigate through the presentation and accomplish objectives. When authoring a presentation, a user may associate a user initiated event or internally generated event with a module action. Authoring may be performed through an authoring interface provided by an authoring tool. The authoring tool may save a presentation as a package which can be distributed.

20 Claims, 13 Drawing Sheets

U.S. PATENT DOCUMENTS

| | | | |
|---|---|---|---|
| 7,424,718 B2 | 9/2008 | Dutton | |
| 7,433,497 B2* | 10/2008 | Chen | 382/107 |
| 7,453,472 B2 | 11/2008 | Goede et al. | |
| 7,526,726 B1* | 4/2009 | Skwarecki et al. | 715/731 |
| 7,703,017 B2* | 4/2010 | Mise et al. | 715/730 |
| 8,024,672 B1* | 9/2011 | Skwarecki et al. | 715/854 |
| 2002/0120593 A1 | 8/2002 | Iemoto et al. | |
| 2002/0165721 A1* | 11/2002 | Chang | 704/503 |
| 2003/0018714 A1* | 1/2003 | Mikhailov et al. | 709/203 |
| 2003/0090506 A1* | 5/2003 | Moore et al. | 345/730 |
| 2003/0222900 A1* | 12/2003 | Schramm-Apple et al. | 345/730 |
| 2003/0228560 A1 | 12/2003 | Seat et al. | |
| 2004/0001106 A1* | 1/2004 | Deutscher et al. | 345/838 |
| 2004/0014017 A1 | 1/2004 | Lo | |
| 2004/0039934 A1* | 2/2004 | Land et al. | 713/200 |
| 2004/0071453 A1* | 4/2004 | Valderas | 386/125 |
| 2004/0128691 A1* | 7/2004 | Egawa et al. | 725/88 |
| 2004/0168149 A1* | 8/2004 | Nirell et al. | 717/105 |
| 2004/0201610 A1* | 10/2004 | Rosen et al. | 345/731 |
| 2005/0154679 A1* | 7/2005 | Bielak | 705/59 |
| 2005/0186550 A1 | 8/2005 | Gillani | |
| 2005/0196730 A1 | 9/2005 | Kellman | |
| 2005/0246642 A1* | 11/2005 | Valderas et al. | 715/730 |
| 2005/0282137 A1 | 12/2005 | Sasinowski et al. | |
| 2006/0024654 A1 | 2/2006 | Goodkovsky | |
| 2006/0061595 A1 | 3/2006 | Goede et al. | |
| 2006/0080610 A1* | 4/2006 | Kaminsky | 715/730 |
| 2007/0282948 A1* | 12/2007 | Praino et al. | 709/204 |
| 2008/0005652 A1 | 1/2008 | Krishnaswamy et al. | |
| 2010/0122220 A1* | 5/2010 | Ainsworth et al. | 715/866 |

OTHER PUBLICATIONS

Jones, V. and Jo, J.H. "Ubiquitous Learning Environment: An Adaptive Teaching System Using Ubiquitous Technology", Beyond the Comfort Zone: Proceedings of the 21st ASCILITE Conference, p. 468-474, Dec. 2004, http://www.ascilite.org.au/conferences/perth04/procs/pdf/jones.pdf.

Blackboard, "Blackboard Learning System. Enhancing Teaching and Improving Learning Outcomes", www.blackboard.com, 2004, http://library.blackboard.com/docs/AS/Bb_Learning_System_Brochure.pdf.

Brusilovsky, P. and Nijhavan, H., "A Framework for Adaptive E-Learning Based on Distributed Re-usable Learning Activities", p. 154-161, https://fnl.ch/LOBs/LOs_Public/FremdMaterial/Brusilovsky2002.pdf.

Interwise, Inc., "Interwise Business Solutions", http://download.interwise.com/documents/Corporate_Collateral/eLearning_Fact_Sheet.pdf.

Office Action dated Aug. 4, 2008, U.S. Appl. No. 11/428,074, filed Jun. 30, 2006.

Avid Pinnacle Studio Plus 10, Sep. 15, 2005, "Slides".

RealNetworks, Inc., RealPlayer Plus User Manual, 2000, 124 pages.

Response to Office Action filed Sep. 8, 2009 in U.S. Appl. No. 11/428,074.

Response to Office Action dated Oct. 29, 2008 in U.S. Appl. No. 11/428,074.

Office Action dated Jun. 8, 2009 in U.S. Appl. No. 11/428,074.

Response to Office Action filed Apr. 3, 2009 in U.S. Appl. No. 11/428,074.

Office Action dated Jan. 6, 2009 in U.S. Appl. No. 11/428,074.

Response to Office Action dated May 19, 2010, U.S. Appl. No. 11/428,074, filed Jun. 30, 2006.

Amendment dated Mar. 4, 2011, U.S. Appl. No. 11/428,074, filed Jun. 30, 2006.

Notice of Allowance dated Apr. 4, 2011, U.S. Appl. No. 11/428,074, filed Jun. 30, 2006.

Office Action dated Dec. 6, 2010, U.S. Appl. No. 11/428,074, filed Jun. 30, 2006.

* cited by examiner

GENERATING MEDIA PRESENTATIONS

BACKGROUND

Slide show applications are used to generate one or more images and provide the images to an audience. The collection of images may have a message or theme, such as a business meeting or lecture content. Some slide show applications allow a user to insert media into one or more slides. The media may include text, images or video. In some cases, slide show applications allow user to associate the inserted media with a hyperlink. In this case, if a user viewing a presentation selects the hyperlink, the slide show may perform a task. The task may include navigating to a particular slide, navigating to a web page, or opening up a file using its corresponding application.

The scope of the interactivity provided by slide show applications is limited. An author of a slide show is constrained by structured slideshow templates when generating a slide show. As such, slide show applications do not allow a user much freedom in constructing a slide show. Further, slide shows are not suitable for interactive presentations. They are designed for one-way communication of information to an audience. Though a presenter may manipulate slide show features to enhance a slide show experience, slide show applications do not allow for much individual interactivity for members of an audience.

SUMMARY

The present technology, roughly described, provides for an authoring and playback mechanism for multi-media presentations. A presentation is an interactive collection of activities. An activity may include one or more frames, wherein each frame includes one or more presentation modules. A presentation module may consist of media content such as video, text, images or other content. A presentation module may also consist of an organized task, such as a quiz.

Presentation modules may perform an action in response to a detected event. The events may be initiated by a user or the presentation. User events are associated with received user input. For example, during playback of the presentation, a user may provide input into presentation modules. In response to the received input, the presentation may navigate from one frame to another, from one activity to another, invoke presentation modules in frames of a current frame or other frames, or perform other actions. Presentation module actions may also be associated with system events. For example, after a video in a particular presentation module of a first frame has completed, the module may invoke playback of a second frame in the presentation.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
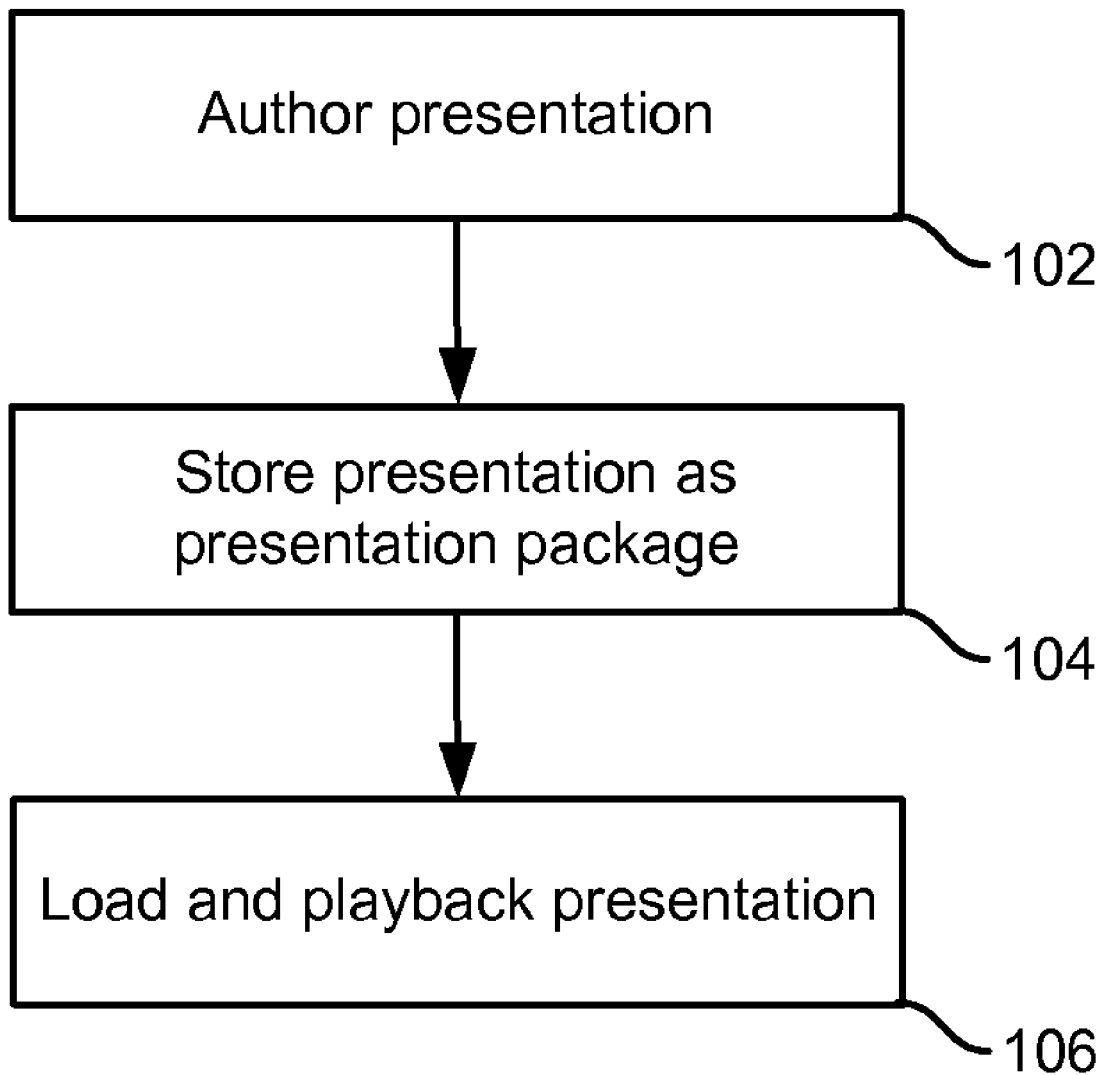
FIG. 1A is a flow chart of an embodiment of a process for authoring and playback of a presentation by a presentation client.

An authoring and playback mechanism is provided for generating and playback of presentations. A presentation is an interactive collection of activities. An activity may include one or more frames, wherein each frame includes one or more presentation modules. A presentation module may consist of media content such as video, text, images or other content such as a game or even simpler more interactive elements such as buttons. A presentation module may also consist of an organized task, such as a quiz. A user may provide input to a presentation module during playback of the presentation. In response to the input, the presentation module may call an action on another module in the same frame that affects the playback of the presentation. In one embodiment, a presentation as described herein allows for non-linear branching that can branch based on several characteristics, such as heuristics, user interaction, assessment, and intervention by a third party or system. This is discussed in more detail below.

During playback of a presentation, an initial frame (or "home" frame) is provided to a user. The presentation modules of the initial frame may provide an image, text, or some other content. After the occurrence of one or more system or user initiated events, other content may be provided to the user in the form of a second frame. In some embodiments, a second activity may be provided in response to the event, thereby providing a new set of frames through which a user may navigate. When a new frame is provided during playback, the presentation modules associated with the new frame are provided through a playback window. During each frame transition, presentation modules associated with the previous frame are terminated. In some embodiments, a presentation module may persist over two or more frames. For example, a presentation module may be associated with a background or foreground frame. This is discussed in more detail below. In any case, a user may navigate through a presentation from frame to frame until the presentation ends or the user ends presentation playback.

In one embodiment, a presentation module may contain media and be implemented as a push button, an image, text, video, a game, a quiz, a question, three dimensional (3-D) animation or some other component. In some embodiments, a presentation module may have a life span which corresponds to the frame in which it is contained or persist over several frames. In one embodiment, the 3-D animation may be provided within a module using a 3-D engine plug-in, which are commonly known in the art and not considered germane to the present technology. When a module includes 3-D animation, a user may select different portions of the animation. For example, if the 3-D animation portrays a rotating planet Earth, a user may select different continents pictured on the rotating Earth. A user selection of South America during presentation playback will provide different results than a user selection of North America or some other continent displayed in the 3-D animation.

Presentation frames may initiate an action on a module in response to a detected event. The events may be initiated by a user usually interacting with a module in the frame where the action took place, or the presentation. User events are associated with received user input. For example, during playback of the presentation, a user may provide input selecting a presentation module consisting of a button. In response to the received input, the presentation may navigate from one frame to another frame, from one activity to another, invoke actions on presentation modules in a current frame or perform other actions. Presentation module actions may also be associated with system events. For example, after a video in a particular presentation module of a first frame has completed, the presentation module may invoke playback of a second frame in the presentation.

In some embodiments, an authoring tool allows a user to generate a presentation. In particular, the authoring tool may provide an authoring interface. The authoring interface may be used to configure activities, frames within an activity, and presentation modules with a frame. In some embodiments, an authoring tool may save a presentation as a package. The presentation package may be saved with or without the presentation content. For example, a package may be saved without presentation module resources and other content, but may include the location of the content used in the presentation.

In some embodiments, the authoring and playback mechanisms for generating and viewing a presentation may be used to generate themed presentations, such as an educational presentation. In this case, the presentation may be used to administer a quiz, teach a subject or perform some other task. The presentation may be configured such that it determines the user's knowledge of a particular subject and tracks a user's learning of the subject. In some embodiments, author configured rules may determine how user input is processed to determine how presentation playback occurs, as well as how other information for a user is generated (e.g., how a user score is generated in response to a user input during a quiz activity). This allows for an adaptive and immersive learning experience. Operation of the authoring and playback mechanisms is discussed in more detail below.

In one embodiment, a presentation may use script to process user input and perform other actions. The script implements a script layer which exists underneath a visual layer of a presentation. The script layer is mapped to the visual layer to leverage functions exposed by the presentation platform. The elements that enable the script layer include variables, module events and actions, global services, and frame or activity events. Script generation in a presentation file is discussed in more detail below with respect to FIG. 8A.

FIG. 1A is a flow chart of an embodiment of a process for authoring and playback of a presentation by a presentation client. The process begins with authoring a presentation at step 102. Authoring a presentation may include executing presentation client 312, loading a presentation, and creating components of the presentation. The presentation components may include presentation modules, frames and activities. Authoring a presentation is discussed in more detail below with respect to FIG. 5.

After authoring the presentation, the presentation may be saved at step 104. In one embodiment saving the presentation includes generating a presentation package. Once generated, the presentation package may be distributed such that the presentation can be played by multiple users.

After saving the presentation, the presentation can be played at step 106. Playback of the presentation may include loading the presentation into presentation client 312, instantiating presentation objects, and playback of the presentation by the client. During playback, a user may provide input to accomplish tasks and navigate through the presentation. Presentation playback is discussed in more detail below with respect to FIG. 10.

Figure 1B:
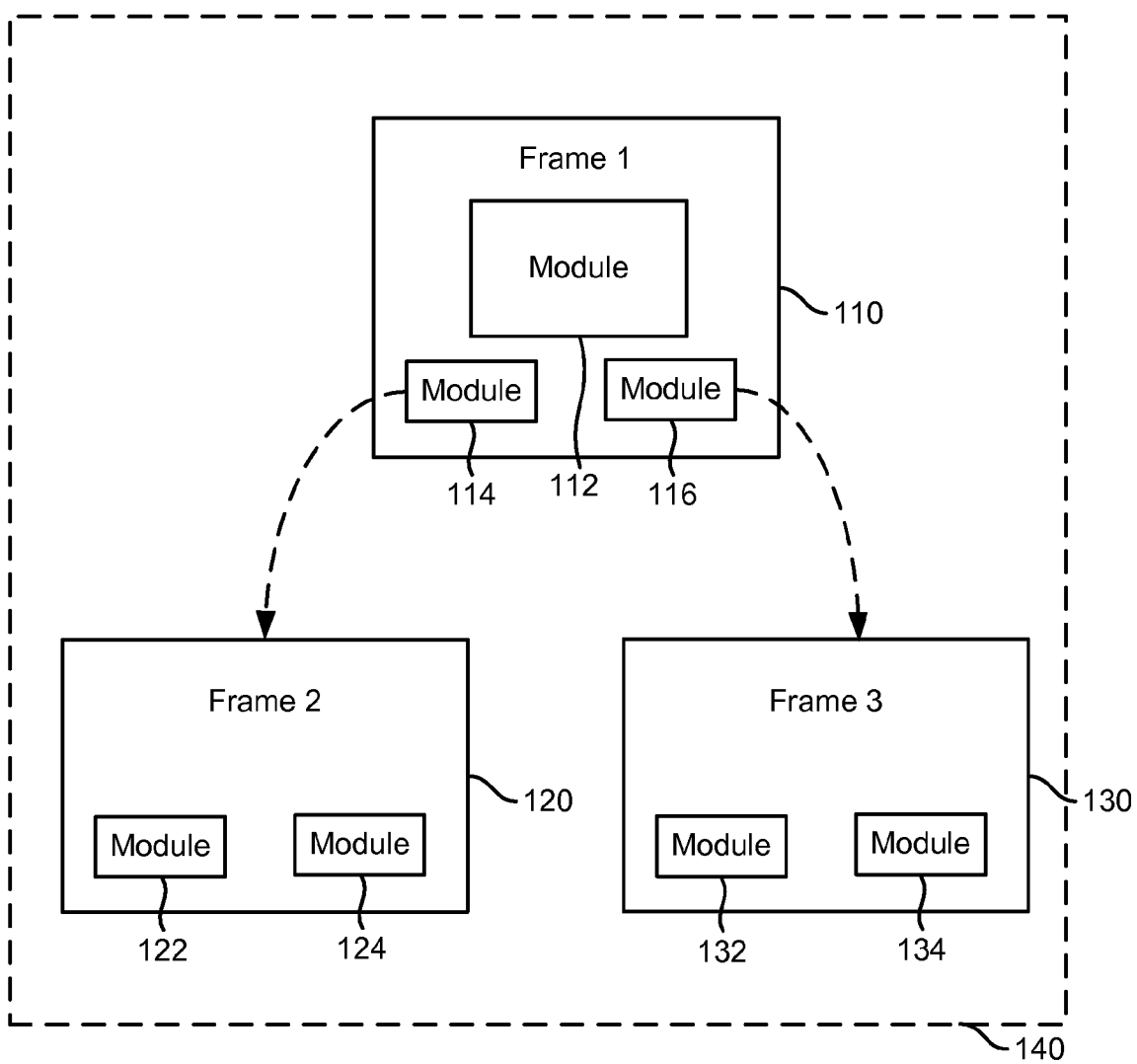
FIG. 1B is a block diagram of a symbolic representation of an activity.

FIG. 1B is a block diagram of a symbolic representation of activity 140. Activity 140 includes a first frame 110, a second frame 120 and a third frame 130. Frame 110 of activity 140 includes presentation modules 112, 114, and 116. Frame 120 includes presentation modules 122 and 124. Frame 130 includes presentation modules 132 and 134. In addition to containing presentation modules, frames 110-130 may also contain layout information and initialization information for each presentation module.

Playback of a presentation is provided by presentation client 312 through a playback window. During playback of the presentation, frames are provided one at a time. With respect to FIG. 1B, the first frame provided in the presentation is frame 110. Upon receiving input into presentation module 114 of frame 110, the provided frame may transition from frame 110 to either of frame 120 or frame 130. When the next frame is displayed, the previous frame ends and is removed from the presentation display. If presentation module 116 is selected by a user during playback of frame 110, then the provided frame will transition from frame 110 to frame 130.

Figure 2:
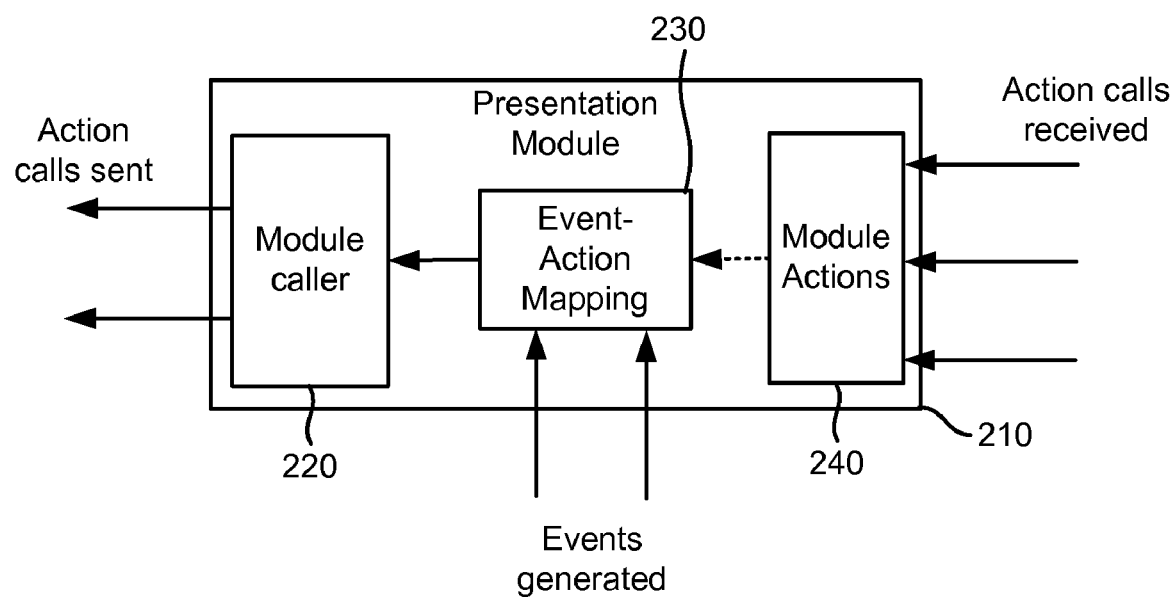
FIG. 2 is a block diagram of an embodiment of a presentation module.

FIG. 2 is a block diagram of an embodiment of presentation module logic. In one embodiment, the block diagram of FIG. 2 provides more detail of event-action logic within a presentation module. Presentation module 210 includes module actions 240, event action mapping 230 and module caller 220. Module actions 240 represent actions that presentation module 210 may perform and other presentation actions may call. For examples, if module 210 consisted of a video, module actions 240 may include actions of "start video," "pause video," and "end video." In this case, another presentation module could send a call to module 210 will a call to "start video." In some embodiments, modules consist of actions and events and do include event to action mapping data. In this embodiment, the event to action mapping data is contained in a frame definition.

Module caller 220 may call actions on other presentation modules. In some embodiments, a presentation module may include one or more methods that enumerate module events and actions. The module events may be internally generated or generated in response to user input. This is illustrated in FIG. 2 by the "events generated" received by event-action mapping 230. Examples of user input that initiates an even includes a right click selection of the presentation module, left click selection of the presentation module, positioning a cursor over the presentation module or some other event. Examples of internally generated events include expiration of a timer, completion of a video, and other events.

The enumerated actions may be those that can be called on the presentation module by other presentation modules. Actions called on presentation module 210 are illustrated as "action calls received." Examples of actions include starting video, ending video, displaying an image, hiding an image and other actions.

In some embodiments, events and actions may include a parameter. For example, a "final score( )" event may include an integer parameter which indicates a score. Similarly, a "start module video" action may include a parameter of ten seconds, indicating that the video is to be started ten seconds into the video.

A presentation module may also call actions on other presentation modules. Actions called by presentation module 210 are illustrated as "action calls sent." Examples of actions that can be called by a presentation module include branching to another frame, calling an action on another presentation module, executing a rule, ending an activity or executing a script.

In some embodiments, a rule called by a presentation module may include an input, engine and output. The rule input may specify a presentation module or global variable. The rule engine may state a condition or calculation that must be met in order for an output to occur. The rule output may comprise an action, another rule or a change in a variable. For example, a rule may comprise logic of "if score is more than five, start second frame." In this case, the score is the input, determining if the score is over five is the engine, and starting a second frame is the output. Rule logic may be saved within objects representing a presentation module. In some embodiments, the rule logic is saved as script code that can be further edited and modified programmatically by the user.

Figure 3A:
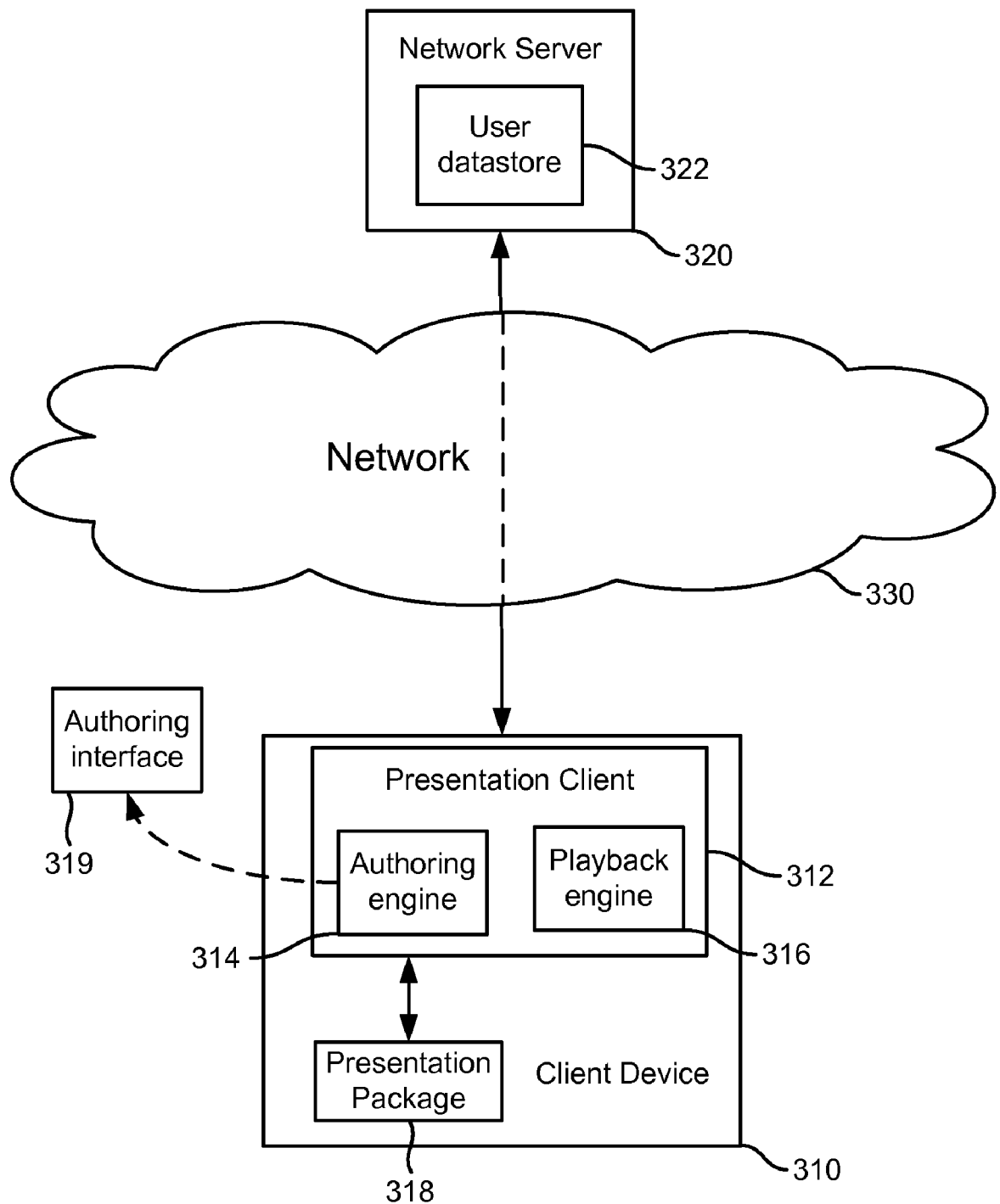
FIG. 3A is a block diagram of an embodiment of a system for providing a presentation.

FIG. 3A is a block diagram of an embodiment of a system for providing a presentation. The block diagram of FIG. 3A includes client device 310, network server 320 and network 330. Client device 310 includes presentation client 312 and presentation package 318. Client device 310 and network server 320 are in communication over network 330. Network 330 may be implemented as the Internet, or some other network.

Presentation client 312 includes authoring engine 314 and playback engine 316. In some embodiments, authoring engine 314 and playback engine 316 may be implemented using the same software components. An example of presentation client 312 is discussed in more detail below with the respective FIG. 3B. Authoring interface 319 provides authoring interface 319, through which a user may generate and modify a presentation file (presentation package). An example of an authoring interface is discussed in more detail below with respect to FIG. 9. Playback engine 316 provides playback of a presentation in a playback window (not illustrated in FIG. 3A).

Presentation package 318 contains data associated with a presentation. In one embodiment, presentation package 318 includes data in XML format. Package 318 may include the media content of each frame, or contain location information for the media content. In one embodiment, presentation package 318 may include a network address (such as a URL) for content of a frame. For example, content of package 318 may be located and accessed from user data store 322 over network 330. More information with respect to a presentation package is discussed below with respect to FIGS. 6-7.

Figure 3B:
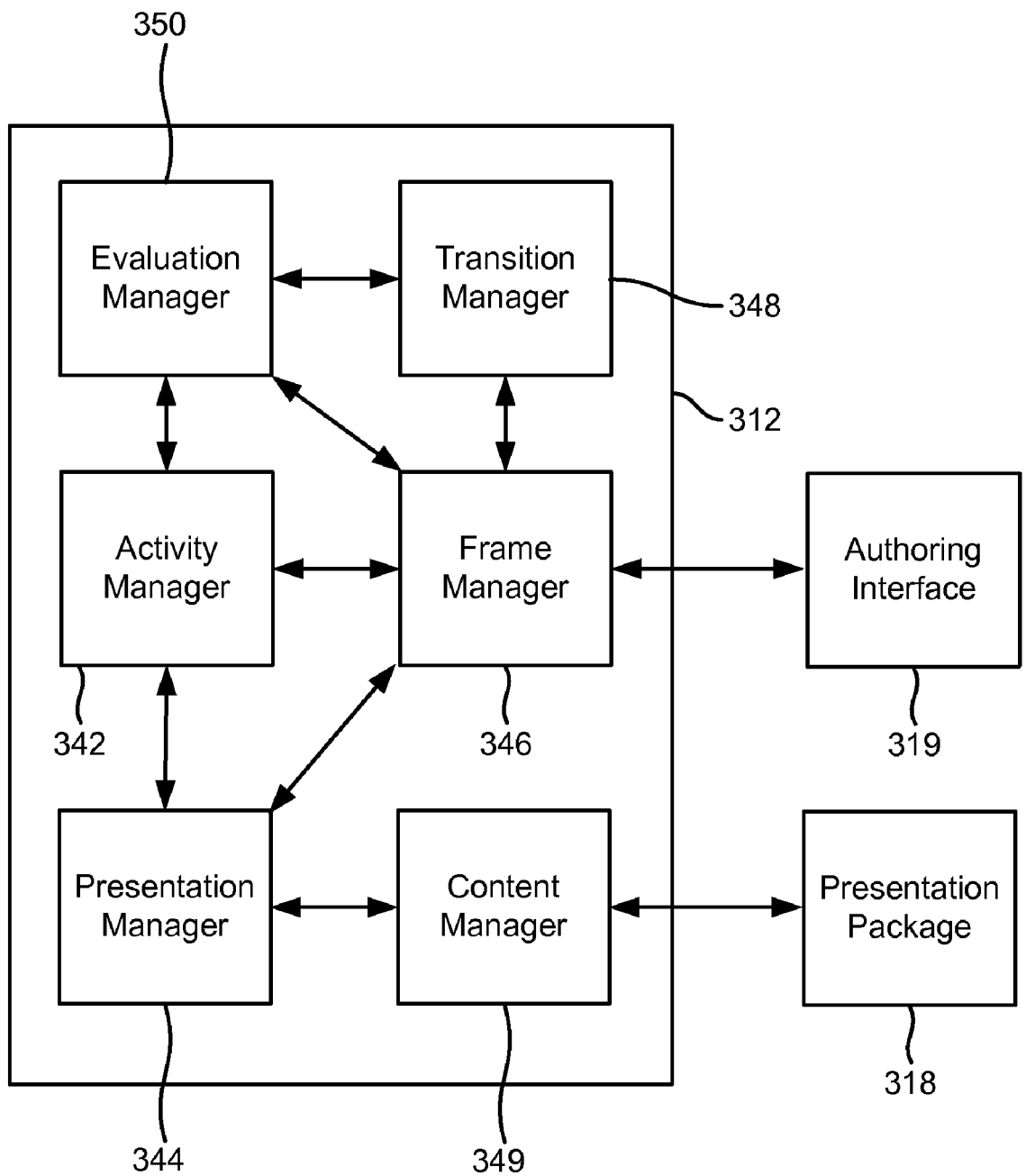
FIG. 3B is a block diagram of an example of a presentation client.

FIG. 3B is a block diagram of an example of presentation client 312. Presentation client 312 includes activity manager 342, presentation manager 344, frame manager 346, transition manager 348, content manager 349 and evaluation manager 350. In one embodiment, client application 312 may communicate with authoring interface 319 through frame manager 346 and with presentation package 318 through content manager 349.

Presentation manager 344 initializes content manager 349 and frame manager 346. Initialization of managers 349 and 346 may occur upon authoring a presentation package. In some embodiments, presentation manager 344 manages a presentation object associated with the presentation. In this case, when a new presentation package is loaded, presentation manager 344 determines a first activity (the "home" activity) to present during playback of the presentation and passes the home activity to frame manager 346. As subsequent activities are to be played, presentation manager 344 provides the activities to frame manager 346. Operation of presentation manager 344 is discussed in more detail below.

Activity manager 342 is in communication with presentation manger 344 and frame manager 346, and configures activity data for a presentation. In some embodiments, activity manager 342 also handles the execution of rules within an activity. For example, when a frame implements a quiz, and user selection of presentation modules is to be saved and processed, frame manager 342 stores the received user input and processes the input according to the rule logic. Content manager 349 stores, saves, loads and otherwise processes presentation data. In particular, content manager 349 loads a presentation package to be modified or played, retrieves information from the presentation package and provides the information to presentation manager 344.

Frame manager 346 handles frame transitions and other frame tasks. In some embodiments, frame manager 346 tracks the current frame and receives frame events, module events and module state information. Receiving events may include receiving data from a presentation module, parsing the received data and calling an appropriate action on behalf of the presentation module. Transition manager 348 handles transitions between frames in a presentation. In some embodiments, handling frame transitions includes receiving the current frame and next frame from frame manager 346, ending the presentation modules of the current frame, loading the next frame and presentation modules of the next frame, and resuming any presentation modules of the previous frame which are configured as persistent presentation modules. This is discussed in more detail below.

Evaluation manger 350 communicates with transition manager 348, activity manager 342 and frame manager 346 and handles evaluations, assessment and other related tasks. As discussed above, some presentations may implement a quiz or other type of education presentation. The educational presentation my test a user's knowledge of some subject, such as math, English, history, or some other subject. Evaluation manager 350 hosts logic to control branching between and manipulation of the set of questions that form an evaluation. Function that can be performed by evaluation manager 350 may include storing a correct answer, scoring a question of a question module, and other tasks associated with an evaluation.

In some embodiments, evaluation manager 350 may access learning profiles for one or more users. The learning profiles may be stored with a presentation or at some other location, such as client device 310 or network server 320. Each learning file may in contain information for a user such as learning style, preferences, accessibility profile, prior knowledge and expertise in a subject area, and current weaknesses. Learning profiles can be updated by evaluation manager 350 as a user progresses through presentation. For example, if a user does well in presentations which test a user's ability at math but poor for presentations teaching English, evaluation manager 350 may update the user's learning profile accordingly. In one embodiment, the user's learning profile may indicate a user progress by containing the names of learning presentations which the user has successfully completed (such as "multiplication presentation A", "Algebra Class—Chapter 1", and so on).

Evaluation manager 350 may handle evaluations. In one embodiment, an evaluation is a construct which links two or more questions of different questions modules (discussed below with respect to step 835 of FIG. 8A) for reporting, directing user process through a presentation, or some other purpose. An evaluation contains evaluation logic contained in evaluation manager 350. Evaluation logic may direct user progress through a set of items, score an item, display feedback, combine results from multiple questions, control the layout of questions modules, and perform other tasks. Each evaluation may be associated with evaluation settings such as start and end time and/or date, time limit, a list of authorized users, whether or not questions are displayed in random order, and other settings.

Evaluation manager 350 may also handle an evaluation answer key. An evaluation answer key contains answers to questions for an evaluation and can be stored with a presentation file. For each question in an evaluation, the evaluation answer key may contain data such as the question, possible answer choices, correct answer, and other data.

Figure 4:
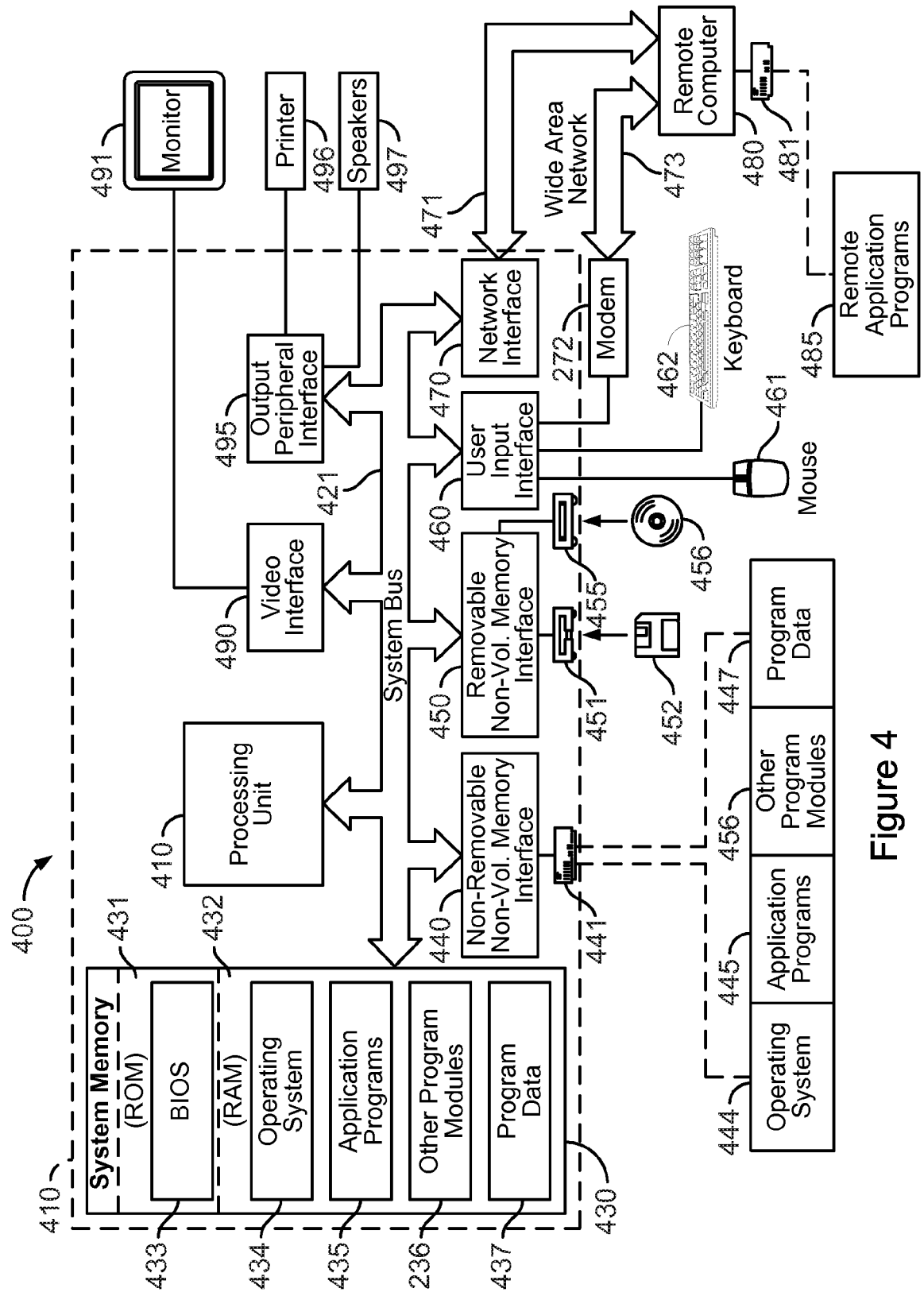
FIG. 4 is a block diagram of an embodiment of a system for implementing the present technology.

FIG. 4 illustrates an example of a suitable computing system environment 400 on which the present technology may be implemented. The computing system environment 400 is only one example of a suitable computing environment and is not intended to suggest any limitation as to the scope of use or functionality of the technology. Neither should the computing environment 400 be interpreted as having any dependency or requirement relating to any one or combination of components illustrated in the exemplary operating environment 400. The computing systems of FIG. 4 may be used to implement client device 310 and network server 320.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the technology includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 40 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 490.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Figure 5:
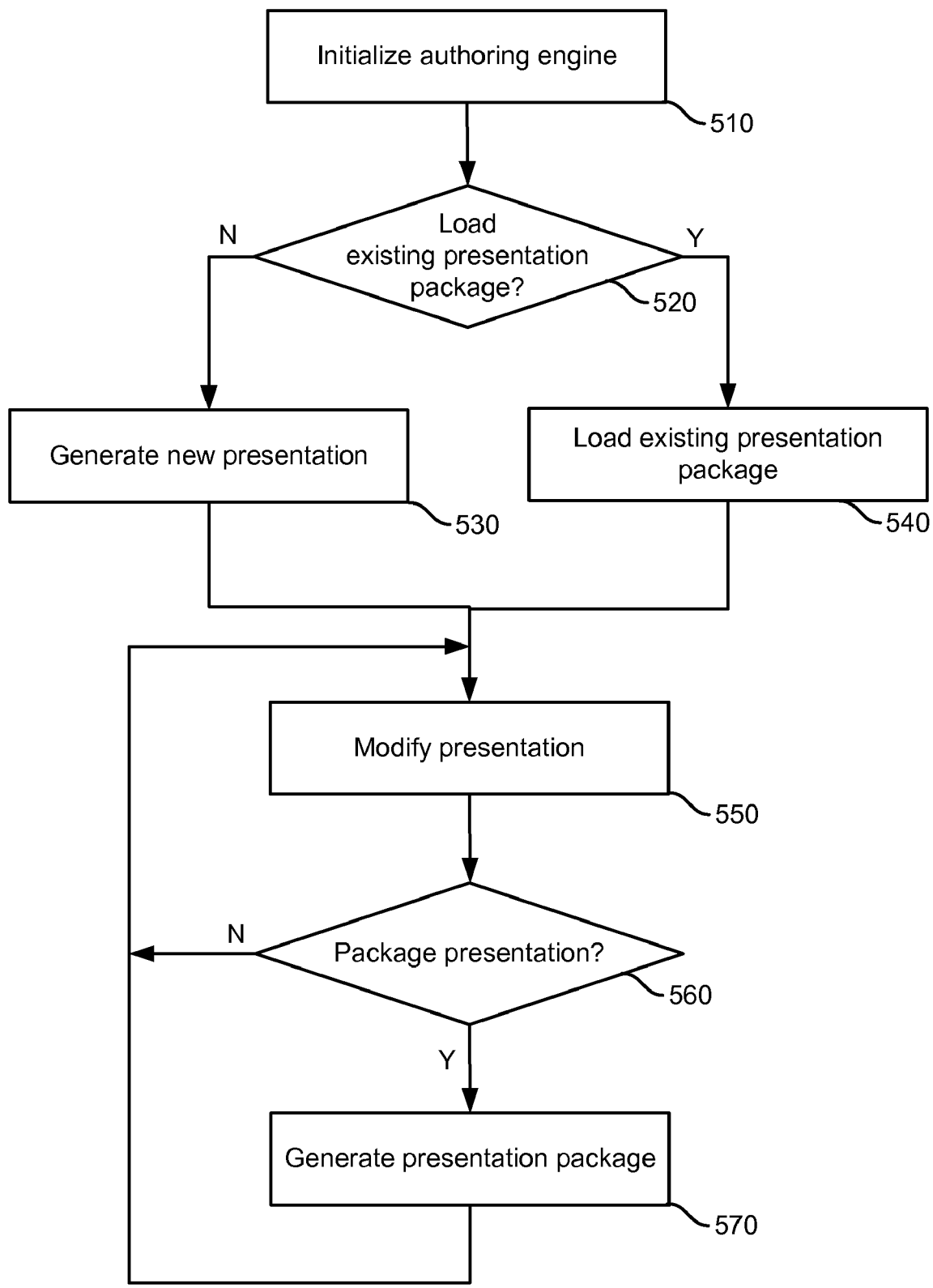
FIG. 5 is a flowchart of an embodiment of a process for authoring a presentation.

FIG. 5 is a flowchart of an embodiment of a process for authoring a presentation. The flowchart of FIG. 5 begins with initializing an authoring engine at step 510. In one embodiment, authoring engine 314 is initialized by loading presentation client 312. Next, a determination is made as to whether an existing presentation package should be loaded at step 520. This determination involves whether or not a user provides input to generate a new presentation or select an existing presentation. If a new presentation is to be generated, the flowchart of FIG. 5 continues to step 530 where the new presentation is generated. Generating a new presentation may involve configuring a presentation template. The presentation template may include a home activity which includes a first frame. Generation of a new presentation is discussed in more detail below with respect to FIG. 6. After generating a new presentation, the flowchart of FIG. 5 continues to step 550.

If an existing presentation package is to be loaded, a selected presentation package is loaded at step 540. Loading an existing presentation package may include receiving input selecting a presentation package, loading the selected presentation package and extracting information from the package, instantiating classes of presentation modules, frames and activities from the extracted information, and performing other tasks. Loading an existing presentation package is discussed in more detail below with respect to FIG. 7. After loading the package, the flowchart of FIG. 5 continues to step 550.

A presentation is modified at step 550. Modifying a presentation may include adding, removing or changing the presentation activities, frames or presentation modules. Modifying a presentation is discussed in more detail below with respect to FIG. 8A.

After modifying the presentation, a determination is made as to whether the presentation should be packaged at step 560. In some embodiments, the presentation should be packaged if input is received from a user indicating that the user wishes to save the presentation. In some embodiments, presentation client 312 may automatically save a presentation file in response to a certain event, such as a timer event. Once packaged, the packaged presentation can be distributed. If at step 560 the presentation is not to be packaged, the flowchart of FIG. 5 returns to step 550. If the presentation is to be packaged, a presentation package is generated at step 570. After packaging the presentation, the flowchart returns to step 550.

In one embodiment, the content manager may collect the information needed to package the presentation and generate the package. An example of the format of a presentation package is below.

```
PackageFile.gxml
Activity__1__Folder
    ActivityInfo.xml
    ResourceTable.xml
    Frame__1 (Folder)
        Layout.xaml
        Video__1__Property.xml
        Game1Btn__2__Property.xml
        Game2Btn__3__Property.xml
    Frame__2 (Folder)
        Layout.xaml
        Game__4__Property.xml
    Back__Persist__Frame (Folder)
        Layout.xaml
        Game__5__property.xml
    Front__Persist__Frame (Folder)
        Layout.xaml
        Button__6__property.xml
    Resources (Folder)
        VideoFileToPlay.mpg
        Img1__resxId2.png
        Img1__resxId3.png
```

The PackageFile.gxml file is the main manifest file for the presentation. The Activity_Info.xml file contains information needed for an activity. The Layout.xaml file contains the layout information for a frame. The Video__1_Property.xml, Game1Btn__2_Property.xml and Game2Btn__3_Property.xml files contain information specific to their corresponding presentation modules. For example, these files can be custom data needed for the presentation module. The Resources_Folder file contains a list of resources required for the activities of the presentation. In one embodiment, in order to handle name conflicts, the system may append the resourceId to each resource name. For example, for resources called C:\proj1\images\image1.jpg and C:\proj2\mages\image1.jpg, the resources may be stored in the package with names Image1_resxId1.png and Image2_resxId2.png.

Figure 6:
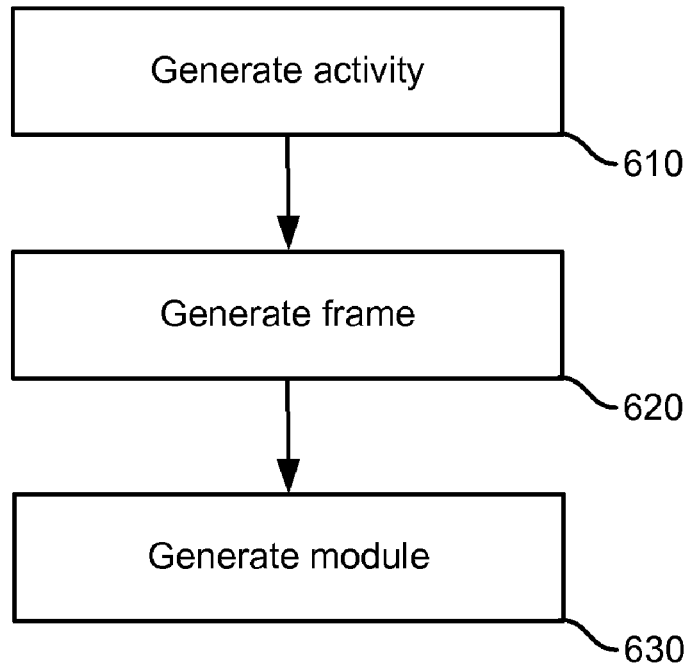
FIG. 6 is a flowchart of an embodiment of a process for generating a new presentation.

FIG. 6 is a flowchart of an embodiment of a process for generating a new presentation. In one embodiment, the flowchart of FIG. 6 provides more detail for step 530 of FIG. 5. First, an activity is generated at step 610. The generated activity may be generated by activity manager 342 of FIG. 3B. The activity may be generated with default value parameters and other data, such as a number of frame slots and background frame information. After generating an activity, a frame may be generated within an activity at step 620. In one embodiment, frame manager 346 generates the frame within a selected activity. The frame may also be generated with default information, such as a default number of presentation module slots in the frame.

A presentation module may be generated at step 630. In some embodiments, rather than generating a presentation module for a new presentation, the frame generated at step 620 may be configured to have a default number of initial presentation module slots. A user may then modify the frame by adding a presentation module in each presentation module slot and/or change the number of slots. Modifying a new presentation is discussed in more detail below with respect to FIG. 8A.

In some embodiments, a new presentation may be generated with a number of objects. These objects may be configured or maintained by content manager 349. The base object is a presentation object. The presentation object may contain the default presentation level settings and properties as well as an initial activity object. In some embodiments, the activity object represents a single activity, a collection of frame objects and a number of methods to add and delete frames. When a new presentation is provided in an authoring interface, the initial frame may be selected in a frame navigator window within an authoring interface. This is discussed in more detail below with respect to FIG. 9. Once loaded into an interface, the activity object may operate to update a frame or workspace.

A frame object may include presentation module wrappers and methods for adding and deleting presentation module wrappers. The wrapper class provides common authoring functionality for presentation modules, such as sizing, initiating editing features and other functions. A presentation module may be associated with a presentation module object. The presentation module object may include one or more media files as well as events, action and property data. The frame object may also include a frame data object. The frame data object can store frame layout and presentation module data.

Figure 7:
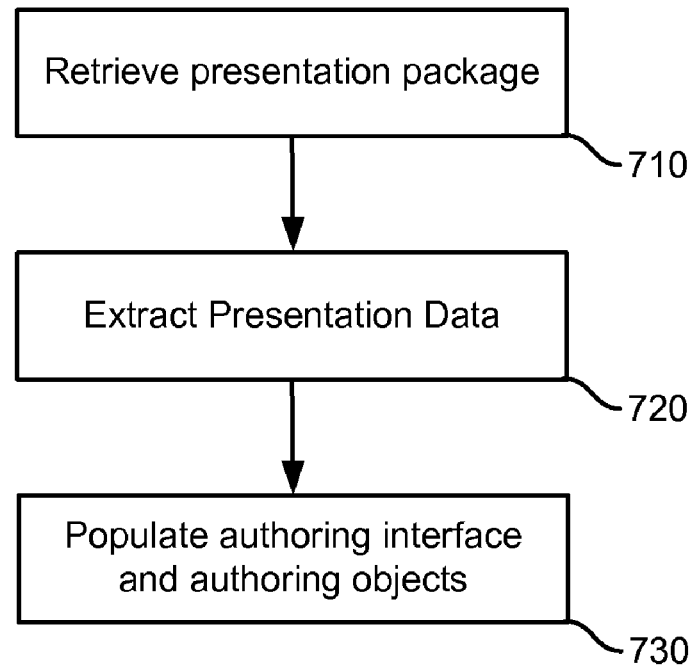
FIG. 7 is a flowchart of an embodiment of a process for loading an existing presentation package.

FIG. 7 is a flowchart of an embodiment of a process for loading an existing presentation package. In one embodiment, FIG. 7 provides more detail for step 540 of FIG. 5. First, a presentation package is retrieved at step 710. A presentation package to be loaded may be selected by a user through an authoring interface. The selected package may then be loaded by content manager 349. Next, presentation data is extracted from the retrieved presentation package at step 720. In one embodiment, the data is extracted by content manager 349. In some cases, content manager 349 may operate to retrieve presentation data serially from the package. After extracting presentation data, authoring interfaces and authoring objects are populated at step 730. In one embodiment, the extracted presentation data is provided to presentation manager 344, which provides portions of the data to frame manager 346. Presentation manager 344 and frame manager 346 then populate the authoring interface and authoring objects (such as activity objects, frame objects, module wrapper objects) with extracted presentation data. For example, a module instance may be created and placed within a frame object of an activity object.

Figure 8A:
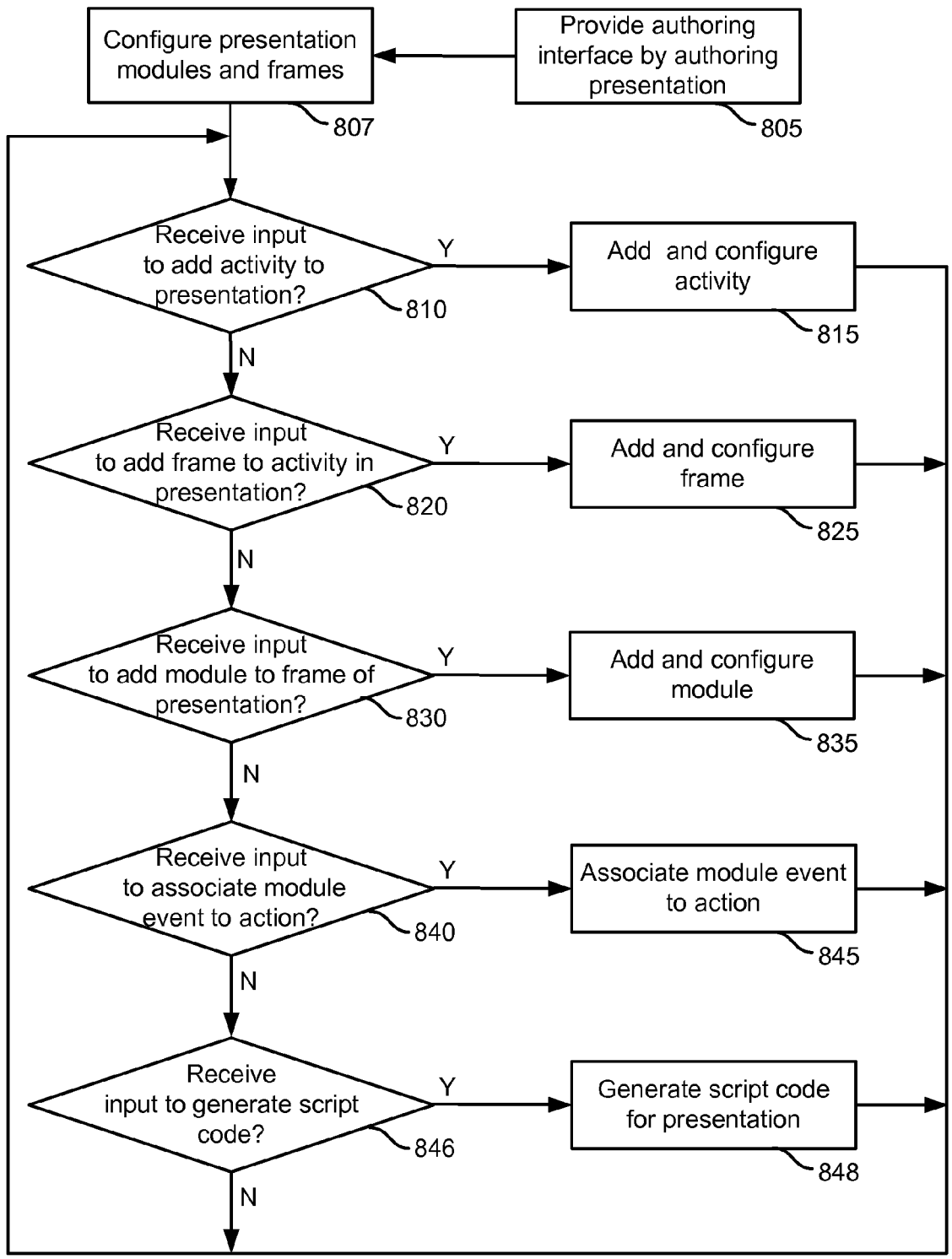
FIG. 8A is a flowchart of an embodiment of a process for modifying a presentation.

FIG. 8A is a flowchart of an embodiment of a process for modifying a presentation. In one embodiment, the flowchart of FIG. 8A provides more detail for step 550 of FIG. 5. In one embodiment, the flowchart of FIG. 8A is performed in work space 940 of the interface of FIG. 9. Though decision steps 810, 820, 830 and 840 are listed in a particular order in the flowchart of FIG. 8A, they can be performed in any order. For example, two frames may be generated for a first activity, followed by generating a second activity, followed by generating one or more presentation modules for a frame, and so on First, an interface is provided for authoring a presentation at step 805. In one embodiment, authoring interface 319 is provided by presentation client 312. Modules and frames for a presentation are configured within the interface at step 807. A presentation may include any number of frames and any number of modules in each frame. Presentation manager 344 may load a home frame or first frame of the presentation into the interface. Representations of the other frames may be loaded as well. In one embodiment, the presentation may include two or more frames, with at least one module in each frame.

Next, a determination is made as to whether input is received which indicates an activity should be added to a presentation at step 810. If no activity is to be added to the presentation, the flowchart of FIG. 8A continues to step 820. If an activity should be added, the activity is added and configured at step 815. Configuring the new activity may include storing activity parameter information, persistent presentation module information and other data. After adding and configuring the activity, the process returns to step 810.

A determination is made as to whether input is received which indicates a frame should be added to an activity of a presentation at step 820. If no frame should be added to a presentation, the process continues to step 830. If a frame should be added to a presentation, the frame is added and configured at step 825. In one embodiment, configuring a new frame includes configuring a background frame, foreground frame, and transition frames. These three component frames of a new frame are discussed in more detail below with respect to FIG. 11. Additional configuration of a new frame may include configuring a number of default presentation module slots, actions that may be called on the frame, and other information. After adding and configuring a new frame, the flowchart of FIG. 8A returns to step 810.

A determination is made as to whether input is received which indicates a presentation module should be added to one or more frames of a presentation at step 830. If a presentation module is to be added, the module is added and configured at step 835. The module may be added to the currently selected frame in authoring interface 319. Configuring a new presentation module may include configuring the module as persistent or not, configuring module properties such as size, cropping, position and other data, selecting events to be generated by the module, selecting default actions that the module may call on other components of the presentation, and other configurations. After adding and configuring a new presentation module, the flowchart of FIG. 8A returns to step 810.

Several types of modules may be added at step 830. In one embodiment, a module may be added and configured as a question module. The question may be in the form of a true/false, multiple choice, multiple response, rank in order, essay, matching objects or have some other format. Each question module may include descriptive data such as item type, item description, keyword, curriculum standard covered, subject area, subject sub-area, level of difficulty, and other data. In some embodiments, a question module may be dynamic. In this embodiment, a question module may provide a question that varies from playback session to playback session. For example, a presentation author may include a variable in a question and a list of values to be chosen at runtime. The variable values may be selected at random, in order, or in some other fashion.

A question module may be associated with an answer key file. Question modules may receive user input during presentation playback. The user input may provide an answer to a question the question module provides. Question modules are configured to provide response information to the answer key file in response to receiving user input during playback. The response information indicates a user selection for the particular question provided by the module, as well as the correct answer (if applicable). Evaluation manager 350 may access the answer key file to determine the progress of the user in the presentation and how many questions the user answered correctly.

In one embodiment, a presentation may extensible to include portions of a presentation that are generated by different users. Thus, two or more users may generate portions of a presentation. In some embodiments, a first user may generate a presentation and a second user may generate one or more modules. The one or more modules generated by the second user may be added to the first user's presentation. The portions may then be combined by one user through presentation client 312. The combined presentation portions can be saved as a single presentation file and played as one presentation during presentation playback.

A determination is made as to whether a module event should be associated with an action at step 840. In one embodiment, an event can be associated with an action in response to user input. If no event is to be associated with an action, the flowchart at FIG. 8A returns to step 810. If an event is to be associated with an action, the module event is associated with the action at step 845. This is discussed in more detail below with respect to FIG. 8B.

Next, a determination is made as to whether input is received indicating that script should be generated for a presentation at step 846. Script may be generated to configure module actions and events, frame and activity level events, and other presentation features. For example, when configuring a module within a presentation (including module events and actions), the presentation application typically generates events and actions hard-coded in the XML for all frames in a presentation. While authoring a presentation, a user can provide input (such as a right click) selecting any event-generating module in a frame (such as a module which implements a button) during authoring to enable script code for the selected element. The received user input may consist of selection of the module, frame or other presentation element to configure with script code. In one embodiment, the selection of the presentation element may produce a menu. The menu may include option for producing script for the selected element. Foe example, for a selected module, the menu may provide a list of the module actions that can be configured to be run from script. If no input is received to generate script for a presentation at step 846, the process of FIG. 8a continues to step 810. If input is received to generate script at step 846, the process of FIG. 8A continues to step 848.

Script code is generated at step 848. In one embodiment, authoring engine 314 may generate script code for the particular module, frame or activity action or event selected by the user at step 846. Generating script begins with generating the actual script code to implement an action. In one embodiment, the script code may be generated from a script code template object. In this embodiment, a partial script is generated from a script template object, the partial script is completed with missing information, and the completed script is inserted into the presentation file. A link to the completed script is generated in the presentation file XML at a point where the script is to be executed. For example, the link may replace a hard-coded link between a module event and action within the XML code comprising a module.

An instance of the script code template object can be generated by authoring engine 314. The partial script template instance may include the basic script code for the action or event to be implemented. The basic script code may include core language grammar elements, but may be missing variables and functions indicating what presentation element (module, frame, activity) performs the action or event as well as the action or event itself. For example, the script template file may include template script that performs a module action, triggers a module event, performs a frame action, triggers a frame event, and script associated with other presentation actions and events. In some embodiments, certain events are generated by frames, such as "frame begin" and "frame end" or "activity begin" and "activity end". In a similar fashion to script configured for a module, a user can select to have script handle these and other frame events. Examples of frame events that can be handled include override frame transition, signal end of activity, initialize module state(s) within frame (for frame level events), obtain state from modules (for frame level events), and call global services for things such as transmitting a score.

In any case, the missing information for generated script may be added to the partial script code by authoring engine 314. In some embodiments, the missing information is derived from the input received through authoring interface 319 from a user wishing to enable script for the selected element. For example, authoring engine 314 may insert a triggering input, the name of the presentation element (e.g., "module one", "frame two") and the name of the action or event to perform ("start video", "hide image one") in response to receiving input at step 846. The name of the presentation element and a list of action and event names for each element is stored within the XML code describing each presentation module, frame and activity within the presentation file. These names may be retrieved from the presentation file by authoring engine 314 and inserted in the script code. The input for the module action may be selected by a user through authoring interface 319. An example of pseudo partial script code for performing a module action is below:

```
On [input]
    call [module name] [action name]
End [input]
```

The example partial script code includes core language grammar elements of "On", "call" and "End." The text in brackets represents different variables which are inserted in response to the user input received at step 846. The example pseudo script code completed with missing information is below:

```
On RIGHT CLICK
    Ask MODULE1 HIDE IMAGE1
End RIGHT CLICK
```

For the above pseudo code example, the completed script code is inserted into the presentation file associate with the activity and a link to the completed script code is inserted into the presentation file within the XML describing the module actions for "Module1."

The script file generated by authoring engine 314 is made visible to the user (with the initial event handling now in script format) in response to user input. The generated script code can be customized by the user through authoring interface 319. In one embodiment, a user may select a module as in step 846, view the script code associated with that module, and enter additional script to execute upon the appropriate selection of the module. When additional script code is received, the code is saved with the existing script within the presentation file associated with the presentation.

The script code may be implemented in several ways. For example, the script code may include if then statements, describe actions and events using keywords, and implement other script coding features. Additionally, the script language may support definition and access of variables, conditions, loops and basic numeric expressions with assignment of expressions to variables. In some embodiments, the script language may be implemented using "Iron Python" or "Visual Basic" languages, by Microsoft Corporation of Redmond, Wash.

Figure 8B:
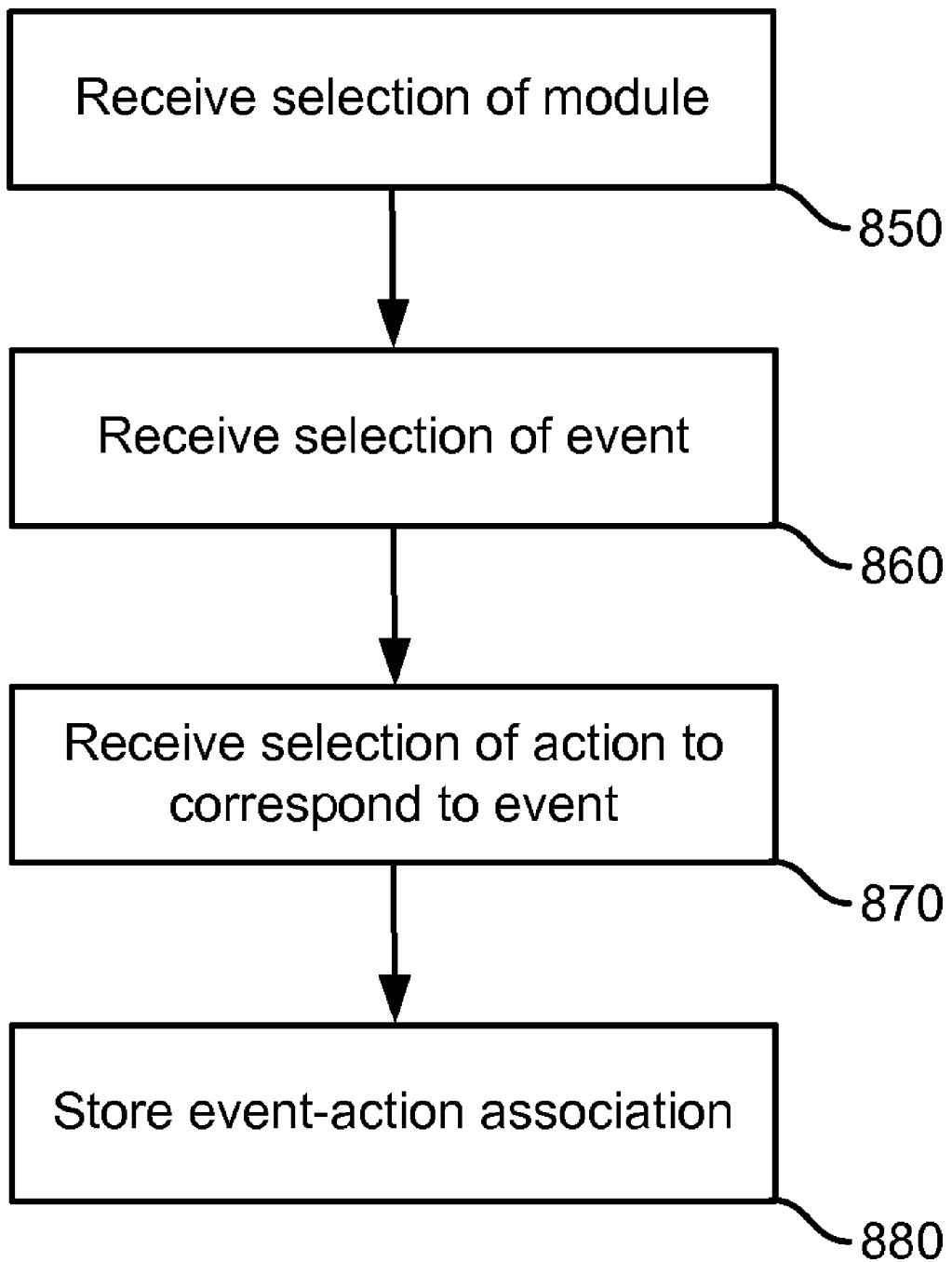
FIG. 8B is a flowchart of an embodiment of a process for associating a presentation module event to a presentation module action.

FIG. 8B is a flowchart of an embodiment of a process for associating a module event to a module action. In one embodiment, the flowchart at FIG. 8B provides more detail for step 845 of FIG. 8A. First, a selection of a presentation module is received at step 850. Next, input is received which selects a module event at step 860. In one embodiment, upon selection of a presentation module at step 850, the interface of FIG. 9 may provide a list of selectable events. This list of available events may be provided in a drop-down menu or some other manner. Examples of selectable events include right click, left click, cursor over, expiration of a timer, end of a video and other events.

After selecting an event, an input is received which selects an action to correspond to the selected event at step 870. In one embodiment, in response to receiving a selection of an event, the interface of FIG. 9 may provide a list of actions that the presentation module may call. A user may associate one or more of the selectable actions to the selected event. In some embodiments, upon selecting an event at step 860, a user may drag the selected presentation module into another presentation module of the current frame, or into another frame. By dragging the presentation module, a user provides input that in response to detecting the event, the presentation module or frame in which the selected presentation module was dropped into should be loaded and/or played back in the presentation.

In some embodiments, the selected action may be evaluation of a rule. As discussed above, the rule may include an input, an engine and an output. If a rule is selected as the action, the rule will be analyzed to see if an action should be performed based on the input and the engine. In some embodiments, a user may select an action of "perform rule." Rules may be generated at any time, and associated with an event during presentation module configuration. In another embodiment, rules may be generated during presentation module configuration using a rule generating interface. After selecting the event and associated action, the selected event and action are stored at step 880. In one embodiment, the event action association may be stored by frame manager 346 as part of the module wrapper object.

Figure 9:
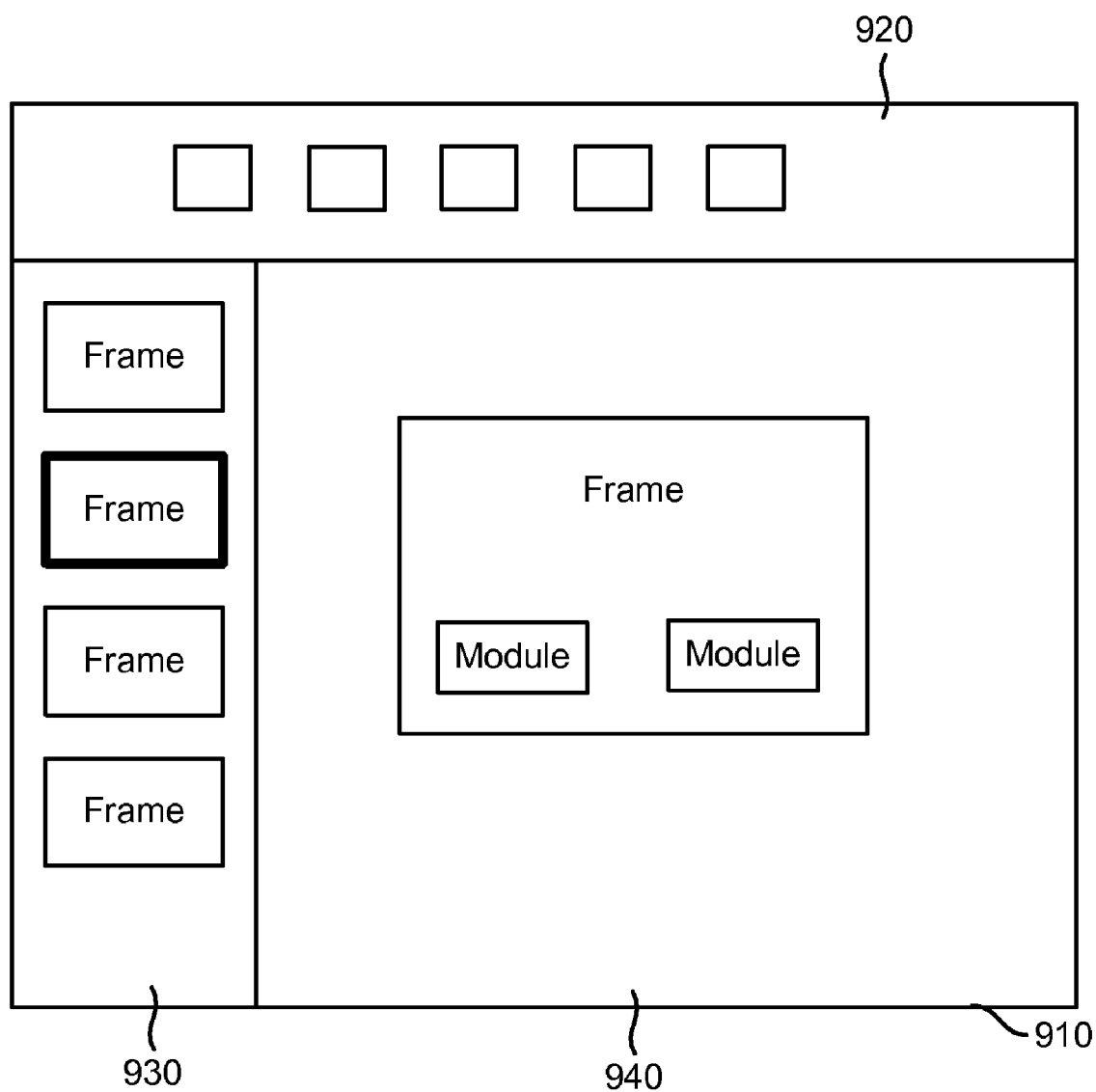
FIG. 9 is an example of an authoring interface.

FIG. 9 is an example of an authoring interface. In one embodiment, interface 910 of FIG. 9 provides more detail for authoring interface 319 of FIG. 3A. Authoring interface 910 of FIG. 9 includes menu and toolbar window 920, frame navigator window 930 and work space window 940. Menu bar and toolbar window 920 may include one or more menus, buttons or toolbars which allow a user to enter input and otherwise manipulate interface 910. Menus may be associated with editing a frame, file operations on a frame (save, new, load and other operations). Examples of buttons may include new activity, new frame, and new presentation module.

Frame navigator 930 provides a representation of the frames within the current activity. The frames representations are derived from the information provided by content manager 349. In some embodiments, frame navigator 930 provides a highlight on the frame representation associated with the frame currently being edited in workspace window 940. Selection of a frame in frame navigator 930 causes that frame to be provided in workspace window 940. In the example embodiment illustrated in FIG. 9, frame navigator window 930 shows four frames in the activity being authored. The second listed frame in window 930 is highlighted, indicating that frame is currently being edited in workspace window 940.

Work space window 940 may provide information for a frame currently being edited. The frame being edited in work space window 940 is the highlighted frame of frame navigator window 930. The selected frame is presented with its corresponding presentation modules. In some embodiments, a module editing interface may be provided for each presentation module in the provided frame. A selected frame and its corresponding presentation modules may be edited and/or modified as discussed above with respect to the flowchart of FIG. 8A.

Figure 10:
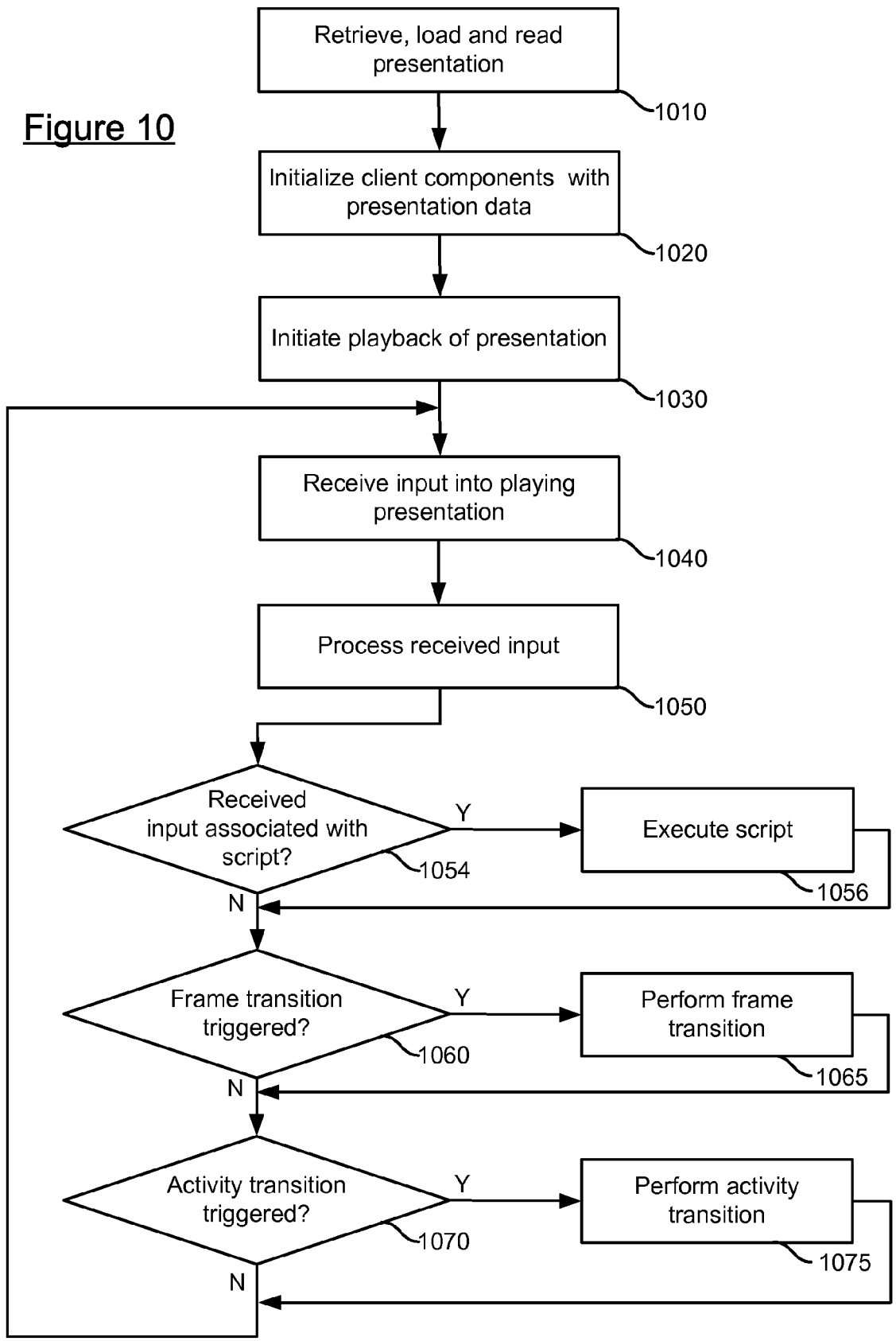
FIG. 10 is a flowchart of an embodiment of a process for playback of a presentation.

FIG. 10 is a flowchart of an embodiment of a process for playback of a presentation. In one embodiment, the flowchart at FIG. 10 may be performed by playback engine 316 of presentation client 312. First, a presentation package may be retrieved, loaded and read at step 1010. In one embodiment, a presentation package may be retrieved and read by content manager 349. Reading the package may include retrieving the activity, frame and module data from the package.

Next, presentation modules of presentation client 312 may be initialized with the presentation data retrieved at step 1020. For each presentation module, frame manager 346 may call an initialization command. After calling this command, resources and a state value may be retrieved and/or determined for each presentation module. Resources may be retrieved form the presentation package itself, or from a location indicated within the presentation package. A state value may indicate a state at which the presentation module was saved. For example, if the presentation module included a video, and half of the video had been previously viewed when the presentation was last saved, the state value would indicate this. State values are stored by content manager 349 when generating a presentation package.

Playback of a presentation may be initiated at step 1030. In one embodiment, initiation of playback may include presentation manager 344 providing the initial activity, initial frame and initial presentation modules to frame manager 346. The content associated with the initial data is presented to a user when the presentation begins at step 1030. After the presentation is initiated and the presentation begins to play, input may be received into the presentation at step 1040. The input may be received into a particular presentation module or the frame itself.

After receiving input, the received input is processed at step 1050. Processing the input may include several steps. In some embodiments, a determination may be made as to whether an event is triggered by the received input. If an event is triggered, an action may be performed in response to the triggered event. In any case, the triggered event is sent to the frame object containing the presentation module. The frame object then relays the event to frame manager 346. In some cases, the received input is stored and processed. This may be applicable for presentation modules that provide a game with a score, a quiz wherein answers of the user are processed, or other presentation module functions.

A determination is made as to whether the received input is associated with script code at step 1054. The received input may be associated with script code if the module or frame selected by the input is configured to execute script code upon being selected. A module or frame may be configured to execute script code if the code describing the module in the presentation file includes script code. In some embodiments, the presentation file may include script code in some portion of the file. The portion of the presentation file which describes the module may contain a link to the script code. The script code may be inserted into the presentation file as discussed above at step 848. The script code may indicate an action or event to perform in response to receiving a particular input selecting a module, frame or activity. The script code may then be loaded into frame manager 346 upon loading the presentation file. When the module is selected with the input described in the script code, the script code is executed by frame manger 346. If the received input is associated with script code at step 1054, the process of FIG. 10 continues to step 1056. If the received input is not associated with script code at step 1054, the process of FIG. 10 continues to step 1060.

Script code associated with the input is executed at step 1056. Executing the script associated with a selected module or frame at step 1054 may result in performing an action (for example, triggering an action in a second module in response to receiving input selecting the module having the script). Executing the script code may include accessing the code from the selected module or frame, parsing the code, and executing the parsed code. In some embodiments, the script code may be compiled at runtime. This may provide a smoother playback experience because script is not compiled during playback upon selection of a module or frame containing script code. Script code may include instructions to trigger an action in another module, cause a frame transition, cause an activity transition, or trigger some other action in response to the event of the present module or frame being selected. In response to executing the script code, the corresponding module action or event, frame action or event, or some other action or event associated with the instructions included in the script code is performed. Performing an action in response to executing script code is performed in the same manner as discussed above with respect to other actions. After executing the script code, the process of FIG. 10 continues to step 1060.

In some embodiments, processing input received during presentation playback may include annotating a presentation. The annotation may be comprised of text, audio, digital ink or speech. The annotation may be saved as part of a module, frame or other portion of a presentation. Playback engine 316 may allow a user to annotate non-linear activity for storage and playback at a later stage.

After receiving the input, a determination is made as to whether a frame transition is triggered at step 1060. In some cases, an event may cause a frame transition. The event may be triggered by a user or some other cause. If the frame transition is triggered, the frame transition is performed at step 1065. Frame transition may be handled by frame manager 346 and transition manager 348. In one embodiment, performing a frame transition may include suspending the frame or ending the frame. If a presentation module within the frame is a persistent presentation module and should be displayed in a subsequent frame, the particular presentation module may be resumed once the new frame is initiated. More detail for performing a frame transition is discussed below with respect to FIG. 11. After performing a frame transition, the flowchart of FIG. 10 continues to step 1070.

A determination is made as to whether an activity transition is triggered at step 1070. Similar to a frame transition, an activity transition may be triggered in response to a user event or a system event. In some embodiments, the activity transition is handled by frame manger 346 and transition manager 348. In any case, if an activity transition is triggered, the activity transition is performed at step 1075. The flowchart of FIG. 10 then continues to step 1040. If an activity transition is not triggered, the flowchart of FIG. 10 returns to step 1040.

Figure 11:
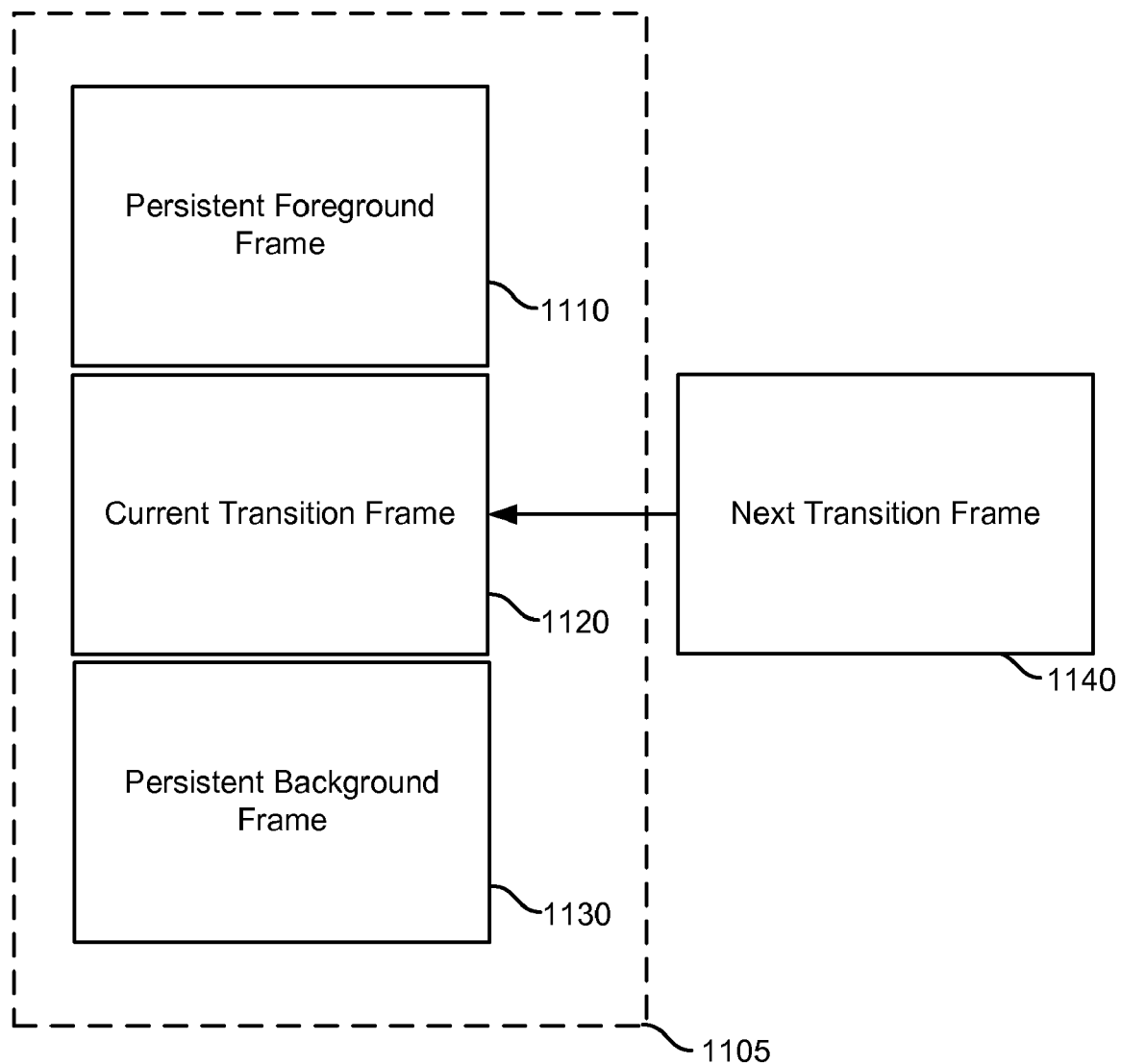
FIG. 11 is a block diagram illustrating a frame transition.

FIG. 11 is a block diagram illustrating a frame transition. A frame transition may be triggered as a result of a detected frame transition or activity transition, as discussed above with respect to steps 1060-1075 of the flow chart of FIG. 10. In some embodiments, two or three frames may be presented at any one time in a presentation during presentation playback. These frames may include a current transition frame 1120 and one or both of a persistent foreground frame 1110 and persistent background frame 1130. When a frame transitions to a new frame, only current transition frame 1120 actually changes. In particular, current transition frame 1120 is replaced by next transition frame 1140 when a frame experiences a transition. To effect the transition, frame manager sends transition manager data for the next frame. Upon detecting a frame transition event, frame manager sends a transition signal to transition manger 348. Transition manger 348 provides the next frame to frame manager 346. Frame manger 346 then ends the current frame, starts the new frame, starts the presentation modules of the new frame, and resumes any presentation modules of the previous frame that were persistent and should exist in the new frame. Foreground frame 1110 and background frame 1130 do not change when a frame undergoes a transition.

In some embodiments, the technology herein can be implemented to accommodate for different accessibility needs. For example, users with limited motor control may be able to interact with a version of a presentation authoring engine and playback engine that incorporate keyboard input rather than extensive use of a mouse or other handheld device. For users with visual impairment, a presentation may be authored and played back through a larger user interface and brighter controls. Alternatively, a user with visual impairment may user aural feedback to navigate through presentation generation and playback. A user with a hearing impairment may utilize captioning and/or subtitles for audio content within a presentation. These options of providing information to users are handled by presentation manager 344 and may be selected using drop down menus in authoring interface 910.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for generating a presentation, comprising:
providing an interface for authoring a media presentation;
configuring a first presentation module within a first frame of the presentation through the interface, configuring said first presentation module within said first frame of the presentation including mapping one or more actions associated with the first presentation module to one or more events associated with the first presentation module;
configuring a second presentation module within a second frame of the presentation through the interface;
receiving input in the first frame to generate script code for the first presentation module within the first frame; and
inserting the script code into a presentation file associated with the presentation, the inserted script code derived from the received input, said step of inserting script code performed in response to said step of receiving input; and
invoking a call to the second frame responsive to the input received in the first frame.

2. The method of claim 1, wherein said configuring the first presentation module in the first frame includes:
creating actions that can be called on the first presentation module.

3. The method of claim 1, wherein said configuring the first presentation module in the first frame includes:
configuring the first presentation module to persist in two or more frames.

4. The method of claim 1, further comprising linking the first presentation module in the first frame to the second presentation module in the second frame, wherein said linking includes:
configuring an event associated with the first presentation module; and
associating a call by the first presentation module to the second presentation module in response to the event.

5. The method of claim 4, wherein the event is a user selection of the first presentation module.

6. The method of claim 4, wherein the event is selected from a list in the interface.

7. The method of claim 4, wherein the call invokes the second presentation module in the second frame.

8. The method of claim 4, wherein the call is selected from a list in the interface.

9. The method of claim 1, further comprising:
configuring transitions between two or more frames.

10. The method of claim 1, further comprising:
configuring a persistent background frame or a persistent foreground frame.

11. The method of claim 1, further comprising:
packaging the presentation into a presentation file.

12. One or more processor readable storage devices having processor readable code embodied on said processor readable storage devices, said processor readable code for programming one or more processors to perform a method comprising:
configuring a first presentation module within a first frame of a presentation;
configuring a second presentation module within a second frame of the presentation;
loading the presentation, wherein the first presentation module in the first frame is linked to the second presentation module in the second frame;
initiating playback of the presentation;
receiving user input to select the first presentation module in the first frame;
determining that the received user input is associated with a script, said user input is associated with the script if the selected first presentation module in the first frame is configured to execute the script;
executing the script associated with the first presentation module in the first frame in response to said determining; and
generating a presentation module event associated with the first presentation module in the first frame in response to executing the script;
performing an action associated with the first presentation module in response to the generated presentation module event, the action including invoking the second presentation module in the second frame.

13. One or more processor readable storage devices according to claim 12, wherein said step of loading the presentation includes:
identifying an initial frame and a persistent frame within the presentation.

14. One or more processor readable storage devices according to claim 12, wherein said step of initiating playback includes:
presenting an initial frame of the presentation to a user.

15. One or more processor readable storage devices according to claim 12, further comprising:
detecting a system initiated presentation module event; and
calling an action associated with the system initiated presentation module event.

16. One or more processor readable storage devices according to claim 12, the method further comprising navigating between frames of the presentation, wherein said navigating between frames of the presentation includes:
generating a user initiated presentation module event in response to executing the script;
calling an action associated with the user initiated presentation module event.

17. One or more processor readable storage devices according to claim 12, the method further comprising:
recording information associated with user input received during presentation playback.

18. A method for generating a presentation, comprising:
providing an interface for authoring a media presentation;
configuring a first presentation module within a first frame of the presentation through the interface, configuring said first presentation module within said first frame of the presentation including configuring a first set of one or more actions associated with the first presentation module and a first set of one or more events associated with the first presentation module, and mapping the first set of one or more actions associated with the first presentation module to the first set of one or more events associated with the first presentation module;
configuring a second presentation module within a second frame of the presentation through the interface, configuring said second presentation module within said second frame of the presentation including configuring a second set of one or more actions associated with the second presentation module and a second set of one or more events associated with the second presentation module, and mapping the second set of one or more actions associated with the second presentation module to the second set of one or more events associated with the second presentation module;

linking the first presentation module in the first frame to the second presentation module in the second frame;

configuring a rule for persisting data associated with user input received during playback of the presentation; and invoking a call by the first presentation module in the first frame to the second presentation module in the second frame in response to the user input received during playback of the presentation.

19. The method of claim 18, wherein said step of configuring a rule includes:

storing user input received during playback of an activity.

20. The method of claim 18, wherein said step of configuring a rule includes:

selecting content to provide to a user in one of the first frame and the second frame in response to results of a user quiz.

* * * * *